E. Brown.
Animal Trap.
Nº 89,626.          Patented May 4, 1869.
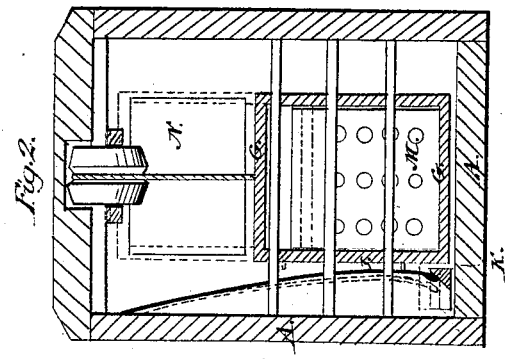
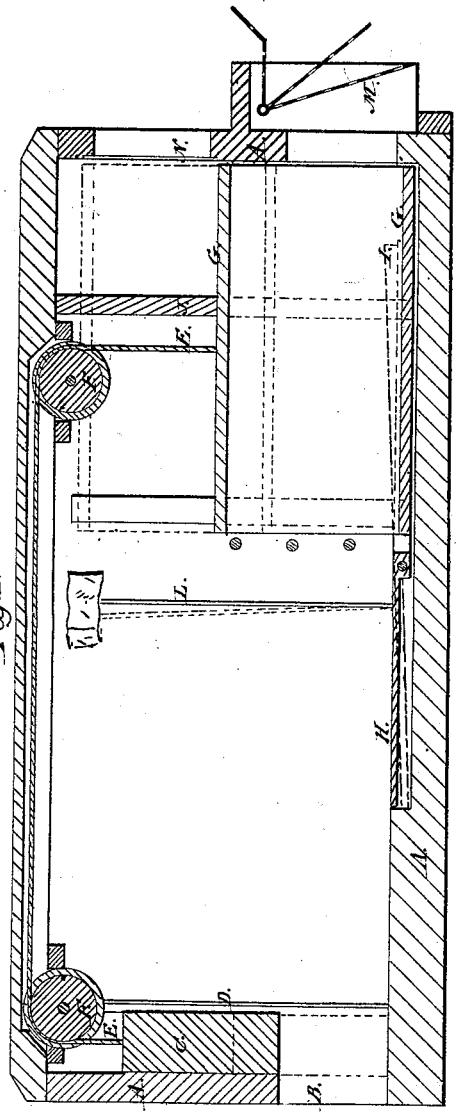
Attest:
H. F. Eberts
Jas. J. Day
Inventor:
Elisha Brown
Thos S Sprague

United States Patent Office.

ELISHA BROWN, OF WAYNE, MICHIGAN.

Letters Patent No. 89,626, dated May 4, 1869.

IMPROVED ANIMAL-TRAP.

The Schedule referred to in these Letters Patent and making part of the same.

*To whom it may concern:*

Be it known that I, ELISHA BROWN, of Wayne, in the county of Wayne, and State of Michigan, have invented a new and useful Improvement in Animal-Traps; and I do declare that the following is a true and accurate description thereof, reference being had to the accompanying drawings, and to the letters of reference marked thereon, and being a part of this specification.

The drawing represents the working part of my apparatus, with portion of the box, or shell, removed.

This invention relates to an improved animal-trap, and consists in employment of a movable chamber, in connection with the door of the trap, the arrangement being such that the closing of the door by the proper devices, hereinafter described, elevates the chamber, and the depressing of the chamber resets the trap. The details of construction and manner of operation will be fully described hereinafter.

A, in the drawings, represents the box, or shell; and

B, a small aperture in the end of said box, or shell, through which the animal may enter.

C is a door, working, vertically, in proper slides D, and suspended from cord E, which passes over pulleys F, and has suspended from its opposite end the chamber G.

This chamber is open at both ends, and is a very little lighter in weight than the door, so that when the former is released, as hereinafter described, the weight of the latter will compel it to fall, closing the aperture B, and raising the chamber.

H is a vibrating platform, pivoted in the floor, with an arm I, extending toward the rear of the box, where it engages with the spring J, and releases it from its engagement with the spur, or catch K, on the side of the chamber.

L are vertical rods, upon the top of which may be secured any suitable kind of bait. These rods L rise from the platform H, and their height should be proportioned to the size of the trap and of the animal designed to be caught.

M is a grated partition, extending across the box in front of the entrance to the chamber G, when said chamber is resting upon the floor of the box, or shell.

N is a window of glass, set in the end of the box, or shell, immediately opposite the chamber G, when the same has been raised to the upper part of the box, or shell, by the closing of the door.

O is an aperture, provided with any suitable door, through which the animal may escape, and so arranged that when he has once passed through, he cannot re-enter the box, or shell.

This aperture O may lead directly into any proper channel, or conductor, which may be extended to any distance, and terminate in any desired cage, or other device for retaining or destroying the animal.

Instead of the cords and pulleys, operating and constructed as hereinbefore described, the door C, and chamber G may be suspended from a properly-fulcrumed double-armed lever.

The aperture B being open, and the bait properly secured, the animal enters through said aperture, and approaches the bait, which is so placed that the animal cannot reach it without going upon the platform, the front part of which being depressed by his weight, elevates the arm I, which disengages the spring J from the catch K, when the greater weight of the door compels it to fall, thereby closing the aperture B and raising the chamber G.

The alarmed animal, finding his retreat cut off, seeks an escape.

The grated partition M, with the sides and end of the box, or chest, prevents such escape, except in one direction.

The two ends of the chamber being open, the said chamber receives light from the window N, and the animal being attracted thereby, leaps into the chamber, when his weight, added to that of the chamber, is heavier than the door, so that the chamber instantly falls to its original position. Retreat is then cut off by the grated partition M, and the animal seeks and finds an outlet through the aperture, as hereinbefore described.

What I claim as my invention, and desire to secure by Letters Patent, is—

The movable chamber G, suspended with the door C, by means of the cord E, when operated by the devices described, in the manner and for the purpose set forth.

ELISHA BROWN.

Witnesses:
  H. F. EBERTS,
  JAS. I. DAY.